United States Patent [19]

Agnoff

[11] Patent Number: 5,421,442
[45] Date of Patent: Jun. 6, 1995

[54] ROLLER WITH TAPERED SHUTTLE

[75] Inventor: Charles Agnoff, Wilmington, N.C.

[73] Assignee: Interroll Holding, A.G., San Antonio

[21] Appl. No.: 275,443

[22] Filed: Jul. 15, 1994

[51] Int. Cl.⁶ .............................................. B65G 13/00
[52] U.S. Cl. .................................... 193/37; 193/35 R
[58] Field of Search ............... 198/500, 501, 780, 842, 198/860.1, 861.1; 193/35 R, 37

[56] References Cited

U.S. PATENT DOCUMENTS

| | | | |
|---|---|---|---|
| 2,696,283 | 12/1954 | Barry | 193/35 R |
| 3,610,387 | 10/1971 | Vom Stein | 193/37 |
| 3,713,521 | 1/1973 | Moritake | 193/37 |
| 3,888,343 | 6/1975 | Snyder | 198/780 |

FOREIGN PATENT DOCUMENTS

| | | | |
|---|---|---|---|
| 254043 | 5/1967 | Austria | 193/37 |
| 3903051 | 5/1990 | Germany | 198/780 |

Primary Examiner—James R. Bidwell
Attorney, Agent, or Firm—Rhodes, Coats & Bennett

[57] ABSTRACT

A roller for a conveyor comprises a roller shaft, a generally cylindrical roller tube rotatably mounted to the roller shaft, and an axially moveable shuttle disposed at one end of the roller shaft. The shuttle is moveable between an extended position and a retracted position. A spring biases the shuttle to the extended position. The shuttle has a tapered-end portion which mates with a mounting hole in a frame member supporting the roller. The spring urges the tapered-end portion of the shuttle into engagement with the mounting hole in the frame so as to eliminate play between the shuttle and the mounting hole.

22 Claims, 7 Drawing Sheets

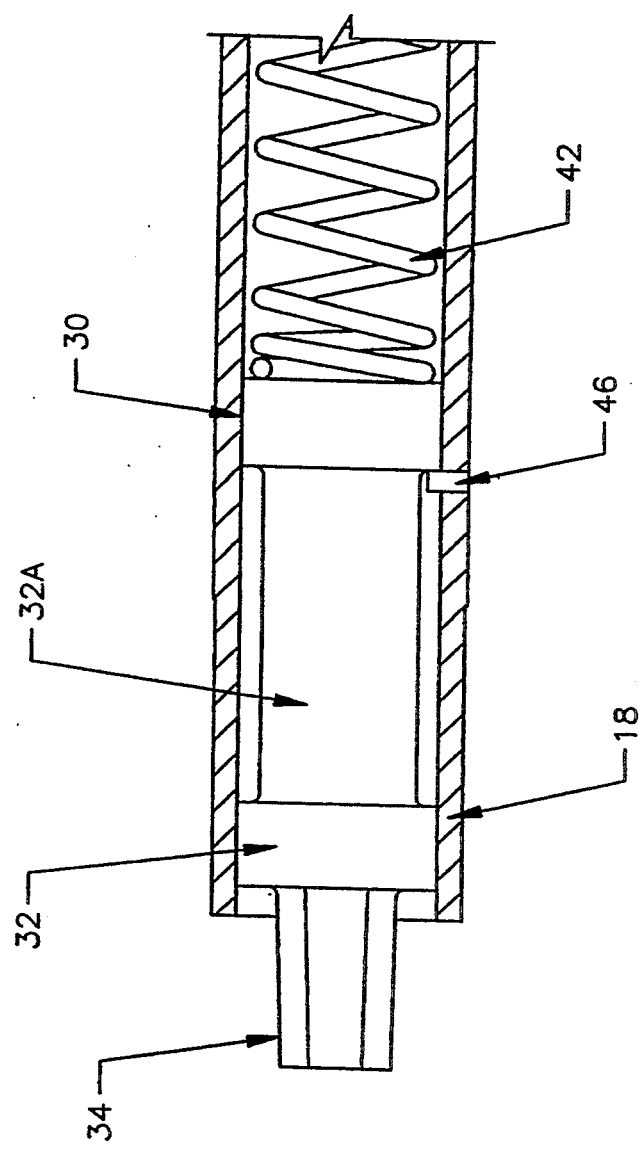

ROLLER WITH TAPERED SHUTTLE

FIELD OF THE INVENTION

The present invention relates generally to improvements in rollers for roller conveyors and, more particularly, to a roller for a roller conveyor having spring loaded shafts.

BACKGROUND OF THE INVENTION

Rollers are frequently used in conveyors, packaging machinery, treadmills, and linear motion material handling devices. Rollers are typically mounted on fixed centers between parallel frames which provide adequate support for the rollers and the articles transported by the rollers. Various methods exist for mounting the rollers in the support frames. One of the most common methods is to use a roller having a spring-loaded shaft. The shaft is extended on both ends of the roller. To install the roller, the shaft is moved axially against the force of the spring and "snaps" in place between the parallel frame members into a suitable hole or slot.

In order to prevent rotation of the shaft in the frame, which could result in substantial wear, the roller shaft and the mating mounting holes or slots in the frame have a polygonal configuration to prevent rotation. For example, the shaft and the mating mounting holes could be hexagonal in shape. Alternatively, when round shafts are used, one or more flats may be formed on the shaft to prevent rotation of the shaft in the frame.

In order to accommodate the tilt angle required to install a spring loaded roller into mounting holes, the mounting holes in the frame are generally 0.030 inches to 0.068 inches oversized to facilitate assembly. Alternatively, if mounting slots are used, the width of the slots are similarly oversized. In most applications, the resulting "play" between the shaft and the mounting hole in the frame presents no operating difficulties. However, in powered conveyors where vibration and side movement can occur, there is a tendency for the shaft to vibrate in the mounting hole causing wear and creating excessive noise. If the mounting hole in the frame wears excessively, it is possible that the shaft will start to rotate in its mounting hole. This unintended rotation of the shaft may lead to premature failure of the roller and/or shaft as well as the frame.

In powered conveyors, the shaft wear problem is exacerbated when the rollers rotate at high speed. Most conveyor rollers utilize welded-steel tubing. Differences in wall thickness of the tube around its circumference as well as a weld seam inside the tube may result in roller tube imbalance. This roller tube imbalance is not a problem in slow speed applications. However, at high speeds, the dynamic imbalance of the tube causes the roller and the shaft to oscillate in the frame mounting hole causing noise and accelerating wear.

Accordingly, there is a need for a roller mounting method which eliminates the play between the roller shaft and the mounting holes in the frame so that excessive wear is prevented.

SUMMARY AND OBJECTS OF THE INVENTION

The present invention provides an improved method for mounting a conveyor roller between parallel frame members. The roller includes a cylindrical tube which is rotatably mounted on a roller shaft. The roller shaft includes a spring-loaded shuttle at one or both ends of the roller shaft. This shuttle has a tapered end portion which engages the mounting holes in the frame members to eliminate play between the shaft and the mounting hole. Preferably, the tapered end portion of the shuttle and its mating mounting hole are shaped to prevent rotation of the shaft. For example, the cross section of the shuttle may be hexagonal, square, or round with one or more flats.

Depending upon the roller design and frame configuration, several alternative shuttle arrangements may be used. The shuttle may be contained in an axial opening in the end of a solid roller shaft or tubular shaft. Alternatively, the shuttle itself may include an axial opening which receives the end of the roller shaft. The shuttle can be retained on the shaft by the use of retaining rings, crimps, pins, or supplementary fasteners.

Other objects and advantages of the present invention will become apparent and obvious from a study of the following description and the accompanying drawings which are merely illustrative of such invention.

BRIEF DESCRIPTION OF THE DRAWINGS

FIGS. 4a and 4b are detail section views showing alternate methods for retaining the shuttle within the roller shaft.

DETAILED DESCRIPTION OF THE INVENTION

Figure 1:
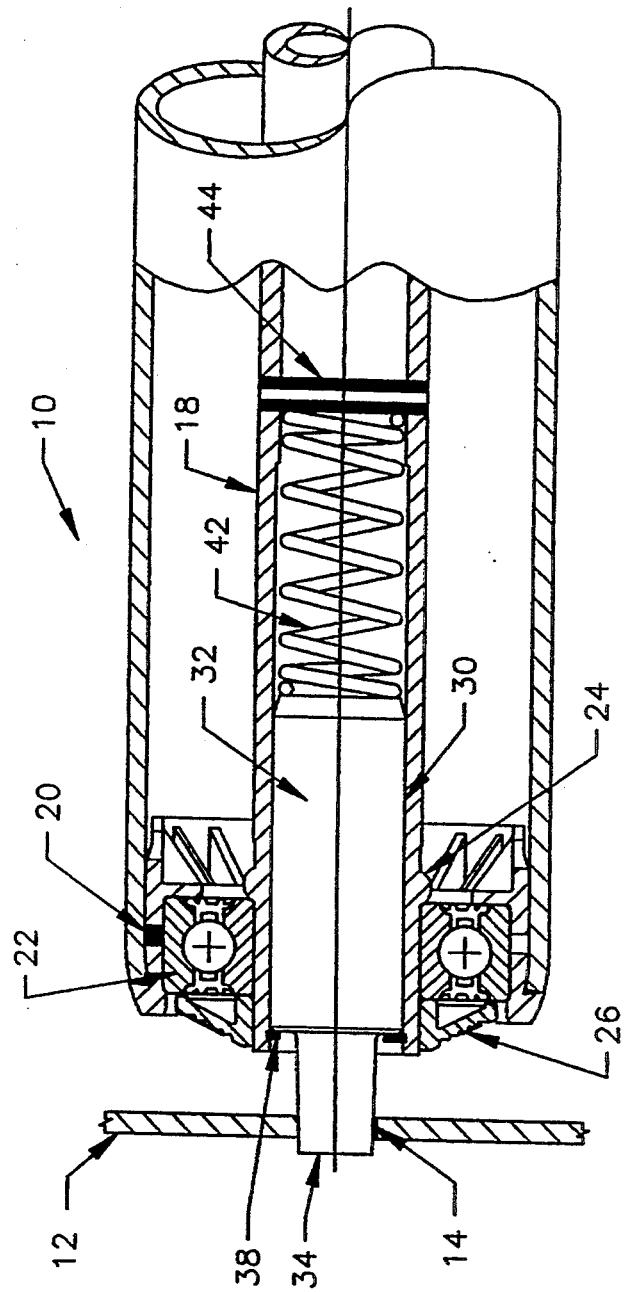
FIG. 1 is a cross-section of the conveyor roller of the present invention.
Figure 2:
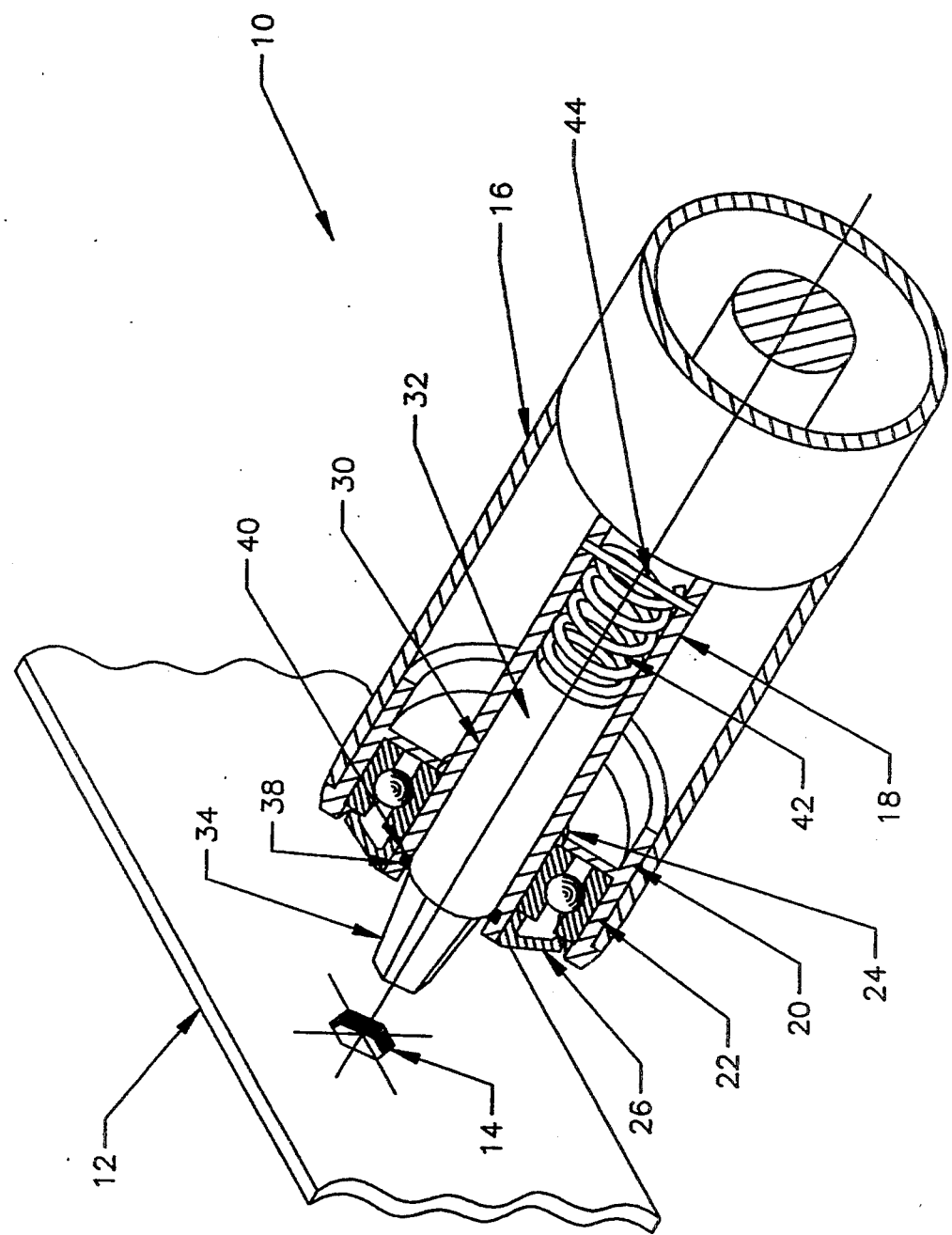
FIG. 2 is a perspective view of the conveyor roller.

Referring now to the drawings, and particularly to FIGS. 1 and 2, the conveyor roller of the present invention is shown therein and indicated generally by the numeral 10. The roller 10 is adapted for use in conveyors, packaging machinery, treadmills, and linear motion material handling devices. The roller 10 is mounted between parallel frame members 12 which support the roller 10 at opposite ends thereof. Each frame member 12 has a series of mounting holes 14 formed therein for mounting the roller 10. The present invention is particularly related to an improved mounting system for mounting the roller 10.

The roller 10 comprises a generally cylindrical roller tube 16 which is rotatably mounted on a roller shaft 18. In the disclosed embodiment, the roller shaft 18 comprises a hollow tube. An end cap 20 is fit into the end of the roller tube 16 and houses a bearing 22. The bearing 22 is retained by friction within the end cap 20. The roller shaft 18 extends through the end cap 20 and is journaled within the bearing 22. An annular ridge 24 is formed on the outer surface of the roller shaft 18 which engages the bearing 22 to prevent axial movement of the roller shaft 18. A bearing shield 26 fits over the end of the roller shaft 18 and covers the bearing 22 to protect the bearing 22 from particulate contamination.

Figure 3:
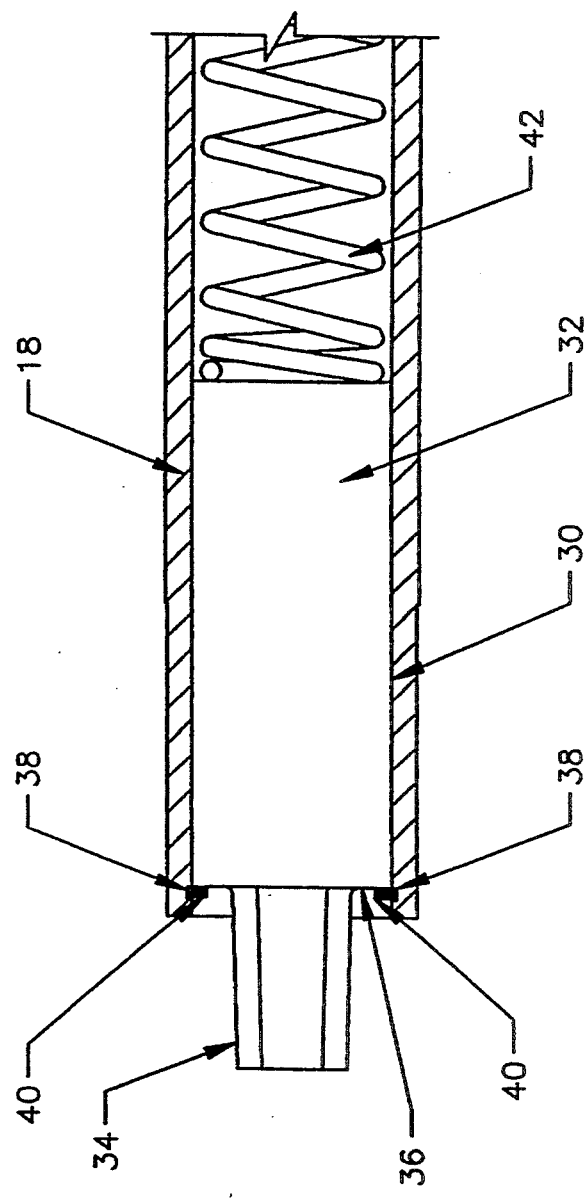
FIG. 3 is a detail section view showing the roller shaft and shuttle.

The roller 10 is mounted between the frame members 12 by means of an axially moveable shuttle 30 at one or both ends of the roller shaft 18. The shuttle 30 is adapted to engage a corresponding mounting hole 14 in one of the frame members 12. As shown in FIG. 3, the shuttle 30 is disposed within the hollow roller shaft 18. The shuttle 30 includes a generally cylindrical body 32 and a tapered end portion 34. The body 32 of the shuttle 30 is sized to slide freely within the roller shaft 18. The tapered end portion 34 is narrower than the diameter of the cylindrical body 32 so that a shoulder 36 is formed at the junction of the body 32 and the tapered end portion 34. The tapered end portion 34 preferably has a polygonal configuration. In the disclosed embodiment, the end portion 34 of the shuttle 30 has a hexagonal configuration. The mounting holes 14 of the frame members 12 have a similar configuration so that rotation of the shuttle 30 in the mounting hole 14 is prevented by the mating geometry.

The shuttle 30 is retained within the roller shaft 18 by a snap ring 38. The snap ring 38 fits into an annular groove 40 formed on the inner surface of the roller shaft 18. The snap ring 38 engages the shoulder 36 on the shuttle body 32 to retain the shuttle 30 within the roller shaft 18.

The shuttle 30 is biased by a spring 42 to an extended position as shown in FIG. 1. One end of the spring 42 engages the bottom of the shuttle 30. The opposite end of the spring 42 pushes against a pin 44 that extends diametrically through the roller shaft 18. The spring 42 is slightly compressed so that the spring 42 always exerts a force against the shuttle 30 urging the shuttle 30 to an extended position.

The tapered surfaces on the end portion 34 of the shuttle 30 eliminate any play between the shuttle 30 and its mating mounting hole 14. The spring 42 will always urge the shuttle 30 outwardly until the tapered surfaces of the end portion 34 seat against the edges of mounting holes 14. To function properly, the width of the tapered end portion 34 must be less than the corresponding dimension of the mounting hole 14 at the outer end thereof and wider than the corresponding dimension of the mounting hole 14 at its base. For example, if the mounting hole 14 is ½' in width, the tapered end portion 34 of the shuttle 30 must be less than ½' of its outer end and greater than ½' at its base. The tapered end portion 34 will seat in the mounting hole 14 at some point between the base and the end where the cross-sectional area of the end portion 34 matches the mounting hole 14.

To install the roller 10 between parallel frame members 12, the roller 10 is held in a tilted position while one end of the roller shaft 18 is inserted into its mating mounting hole 14. After the first end is inserted into its mating mounting hole 14, the shuttle 30 is pressed to move the shuttle 30 to a retracted position. The second end is then lowered between the frame members 12 until the roller shaft 18 is aligned with its mating mounting hole 14 of the frame member 12. When the roller shaft 18 is aligned with the mounting hole 14, the spring 42 urges the shuttle 30 back to the extended position and the tapered end 34 of the shuttle 30 fully engages the mounting hole 14 in the frame member 12. The combination of the spring 42 and the tapered end 34 of the shuttle 30 eliminates any play between the shuttle 30 and the mounting hole 14. As a result, vibration and movement of the roller shaft 18 is substantially reduced.

Figure 4A:
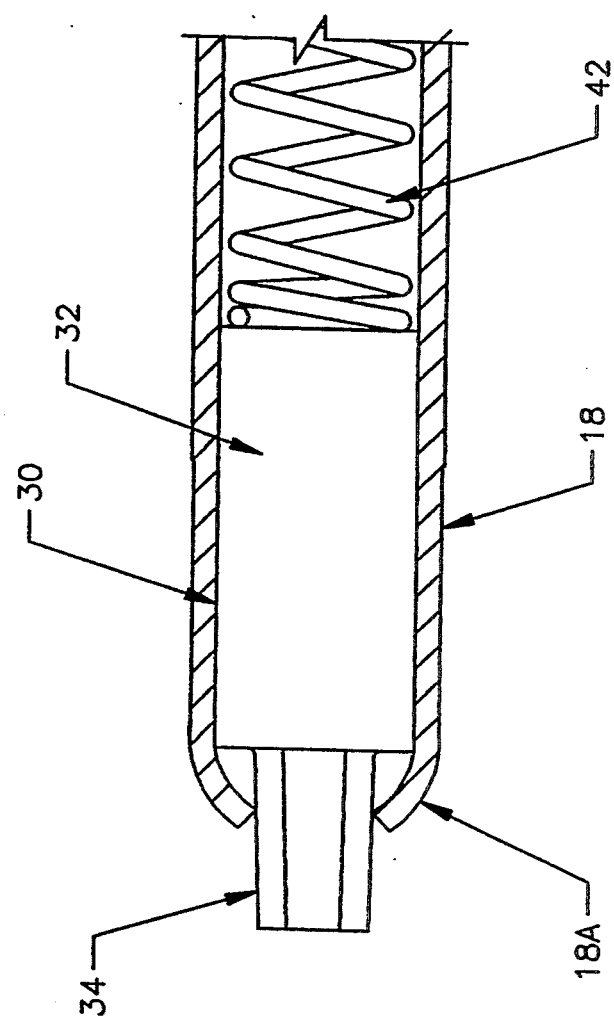

Referring now to FIGS. 4a and 4b, alternate methods are shown for retaining the shuttle 30 within the roller shaft 18. In FIG. 4a, the roller shaft 18 includes a crimped end 18a which retains the shuttle 30 within the roller shaft 18. In FIG. 4b, the shuttle body 32 is formed with a narrow section 32a. A retaining pin 46 inserted through an opening in the roller shaft 18 extends into the annular space surrounding the narrow section 32a to limit the axial movement of the shuttle 30 in two directions.

Figure 5:
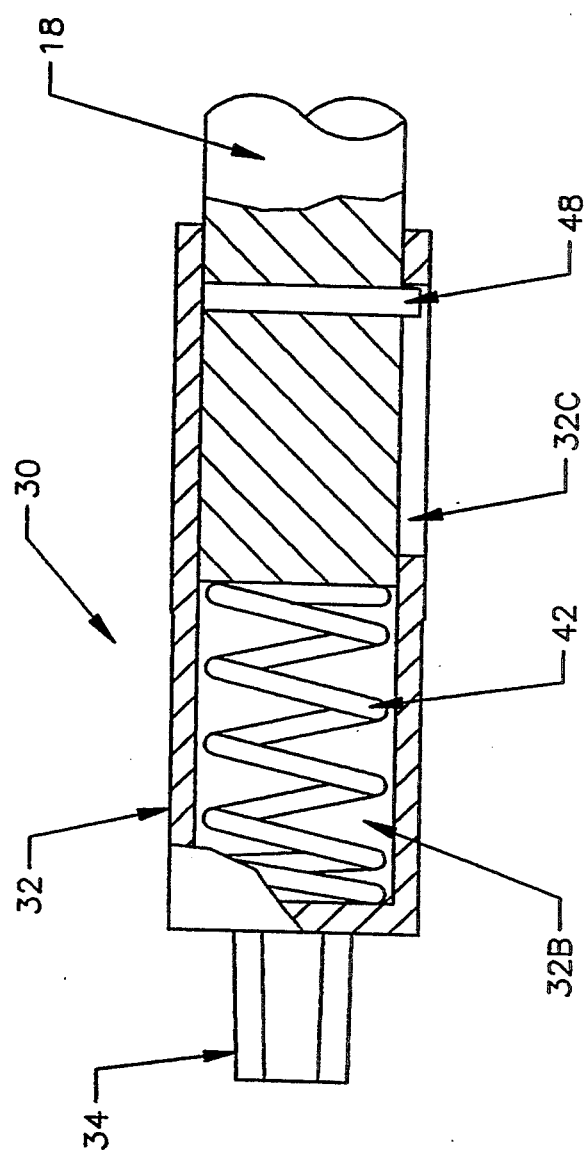
FIG. 5 is a detail section view showing an alternate arrangement for the shuttle.

In FIG. 5, an alternate design is shown for the shuttle 30. In the design shown in FIG. 5, the roller shaft 18 is solid and an axial opening 32b is formed in the shuttle body 32. The shuttle 30 slides over one end of the roller shaft 18. The shuttle 30 is retained on the shaft 18 by a pin 48 which extends into a slot 32c in the shuttle body 32. The biasing spring 42 is disposed in the axial opening 32b. The external shuttle 30 shown in FIG. 5 operates the same as the internal shuttle 30 shown in FIG. 1.

Figure 6:
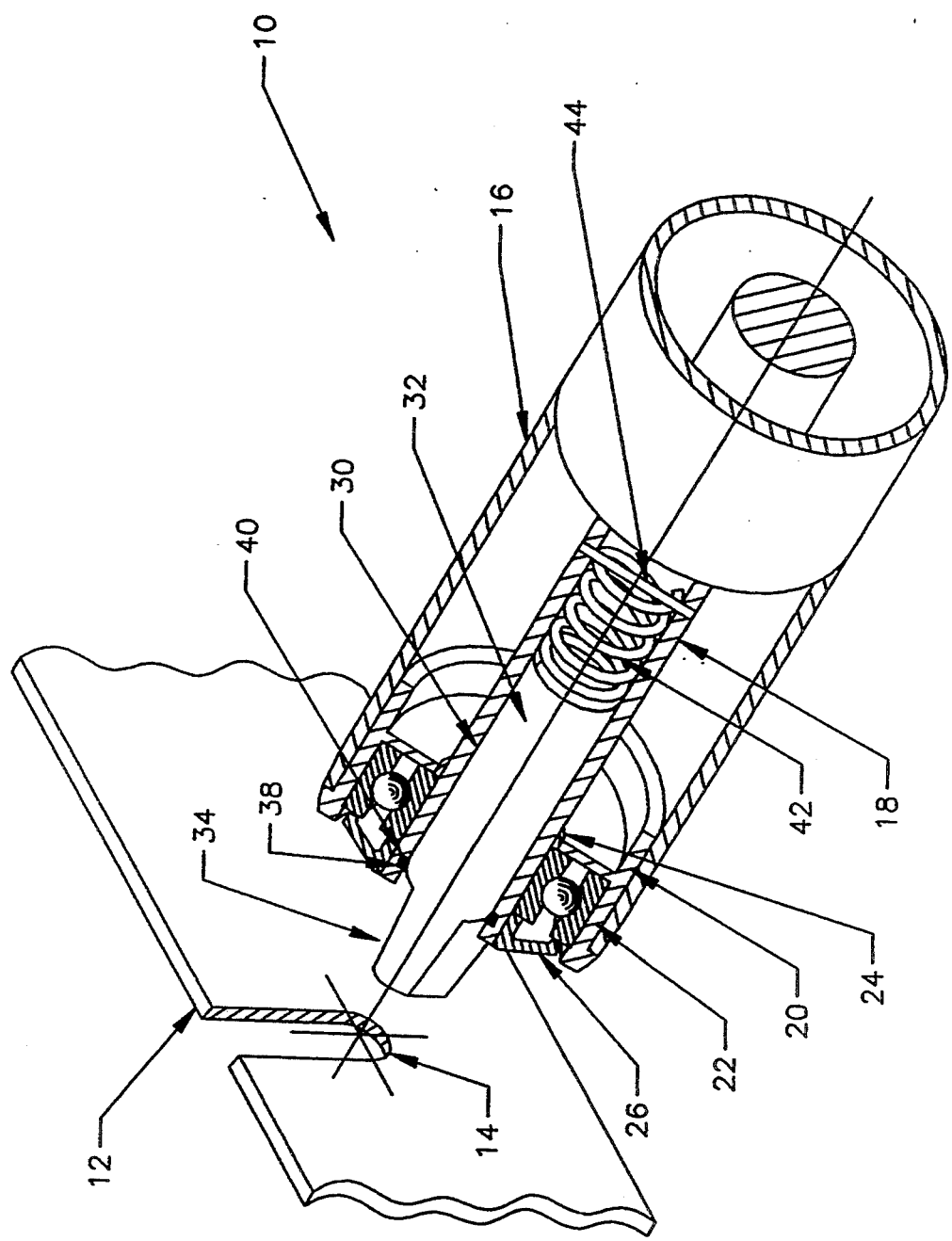
FIG. 6 is a perspective view of an alternate embodiment of the conveyor roller for use with open-ended mounting slots.

FIG. 6 shows a conveyor roller adapted to mount into open-ended slots in the frame 12. The tapered end 34 of the shuttle 30 has a generally circular cross-section with two opposed flats. The flats are tapered as previously described. The tapered end 34 of the shuttle 30 fits into the open-ended slot in the frame 12. The tapered end 34 can be easily inserted into the slot by pressing on the end of the shuttle 30 allowing it to slide downwardly into the slot. When the pressure on the end of the shuttle 30 is released, the shuttle 30 is biased by the spring 42 into engagement with the edges of the slot.

The embodiment shown in FIG. 6 provides a safety feature in applications where the roller is driven by some external means, such as a belt. If a person's clothing or body part gets trapped between the roller 10 and the drive belt, the roller 10 will be lifted upwardly in the slot allowing the person to extract his clothing or body part without serious injury.

Based on the foregoing, it is apparent that the roller mounting system of the present invention eliminates many problems associated with prior art designs related to vibration and movement of the roller 10. The shuttle design eliminates any play between the shuttle 30 and its mating mounting hole 14. As a result, there is significantly less vibration when the roller 10 is used, even in high speed applications. Thus, the design substantially reduces wear such that cost of operation is decreased. Further, the present invention substantially reduces the risk of failure during operation of the roller 10.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

What is claimed is:

1. A roller for a conveyor comprising:
   (a) a roller shaft;
   (b) a generally cylindrical roller tube rotatably mounted to said roller shaft;
   (c) a shuttle mounted at one end of said roller shaft, said shuttle being movable along the axis of the roller shaft between an extended position and a retracted position, wherein the shuttle includes a tapered end portion adapted to be inserted into a similarly shaped mounting hole in a frame member, the tapered end portion being wider at one section than the mounting hole and tapering to an outer end that is narrower than the mounting hole; and
   (d) wherein when the shuttle is moved to the extended position, the tapered end portion seats within the mounting hole in said frame member.

2. The roller according to claim 1 wherein the tapered end portion of said shuttle is shaped to prevent rotation of the shuttle relative to the mounting hole.

3. The roller according to claim 1 further including a biasing member disposed to urge the shuttle to an extended position.

4. The roller according to claim 1 wherein the roller shaft has an axial opening at one end thereof and wherein the shuttle is disposed within the axial opening of the roller shaft.

5. The roller according to claim 4 wherein the roller shaft is a hollow tube.

6. The roller according to claim 4 Wherein the biasing member is disposed within the axial opening in said roller shaft.

7. The roller according to claim 4 further including retaining means for retaining the shuttle within said axial opening in the roller shaft.

8. The roller according to claim 7 wherein the retaining means includes an annular groove formed on an inner surface of said axial opening and a retaining ring insertable into said annular groove.

9. The roller according to claim 7 wherein the retaining means comprises a retaining pin extending axially through the roller shaft for engaging the shuttle.

10. The roller according to claim 7 wherein the roller shaft is crimped at one end thereof to retain the shuttle within the axial opening.

11. A conveyor assembly including:
    (a) a pair of generally parallel frame members having a series of longitudinally spaced openings formed therein;
    (b) one or more rollers disposed between said parallel frame members, said rollers including a stationary roller shaft and a roller tube rotatably mounted on said roller shaft; and
    (c) mounting means for mounting said roller between said parallel frame members, said mounting means including a shuttle mounted for axial movement along said roller shaft between an extended position and a retracted position, said shuttle including a tapered end portion for engaging a corresponding opening in one of said frame members, the tapered end portion having one section that is wider than the opening and gradually tapering to an outer end that is narrower than the opening.

12. The conveyor assembly of claim 11 wherein said mounting means further includes a biasing member disposed to urge the shuttle to an extended position.

13. The conveyor assembly according to claim 11 wherein the tapered end portion of said shuttle is shaped to prevent rotation of the shuttle relative to the corresponding opening in said frame member.

14. The conveyor assembly according to claim 11 wherein the roller shaft has an axial opening at one end thereof and wherein the shuttle is disposed within the axial opening of the roller shaft.

15. The conveyor assembly according to claim 14 wherein the roller shaft is a hollow tube.

16. The conveyor assembly according to claim 14 wherein the biasing member is disposed within the axial opening in said roller shaft.

17. The conveyor assembly according to claim 14 further including retaining means for retaining the shuttle within said axial opening in the roller shaft.

18. The conveyor assembly according to claim 17 wherein the retaining means includes an annular groove formed on an inner surface of said axial opening and a retaining ring insertable into said annular groove.

19. The conveyor assembly according to claim 17 wherein the retaining means comprises a retaining pin extending axially through the roller shaft for engaging the shuttle.

20. The conveyor assembly according to claim 17 wherein the roller shaft is crimped at one end thereof to retain the shuttle within the axial opening.

21. The conveyor assembly of claim 11 wherein the opening in said frame member comprises a vertically-extending slot to permit vertical movement of the roller within said slot.

22. The conveyor assembly of claim 21 wherein said slot is open at one end.

* * * * *

(12) EX PARTE REEXAMINATION CERTIFICATE (8340th)
United States Patent
Agnoff

(10) Number: US 5,421,442 C1
(45) Certificate Issued: Jun. 28, 2011

(54) ROLLER WITH TAPERED SHUTTLE

(75) Inventor: Charles Agnoff, Wilmington, NC (US)

(73) Assignee: Interroll Holding A.G., San Antonio (CH)

Reexamination Request:
No. 90/011,135, Sep. 3, 2010

Reexamination Certificate for:
Patent No.: 5,421,442
Issued: Jun. 6, 1995
Appl. No.: 08/275,443
Filed: Jul. 15, 1994

(51) Int. Cl.
*B65G 13/00* (2006.01)

(52) U.S. Cl. ........................................ 193/37; 193/35 R
(58) Field of Classification Search .................. None
See application file for complete search history.

(56) References Cited
U.S. PATENT DOCUMENTS

| | | |
|---|---|---|
| 1,919,495 A | 7/1933 | Allen |
| 1,949,817 A | 3/1934 | Stonefield et al. |
| 2,696,283 A | 12/1954 | Barry |
| 2,768,725 A | 10/1956 | Foulds et al. |
| 3,610,387 A | 10/1971 | Vom Stein |
| 3,713,521 A | 1/1973 | Moritake |

FOREIGN PATENT DOCUMENTS

| | | |
|---|---|---|
| GB | 2 095 193 A | 9/1982 |
| GB | 2 101 061 A | 1/1983 |

*Primary Examiner* — Joseph A Kaufman

(57) ABSTRACT

A roller for a conveyor comprises a roller shaft, a generally cylindrical roller tube rotatably mounted to the roller shaft, and an axially moveable shuttle disposed at one end of the roller shaft. The shuttle is moveable between an extended position and a retracted position. A spring biases the shuttle to the extended position. The shuttle has a tapered-end portion which mates with a mounting hole in a frame member supporting the roller. The spring urges the tapered-end portion of the shuttle into engagement with the mounting hole in the frame so as to eliminate play between the shuttle and the mounting hole.

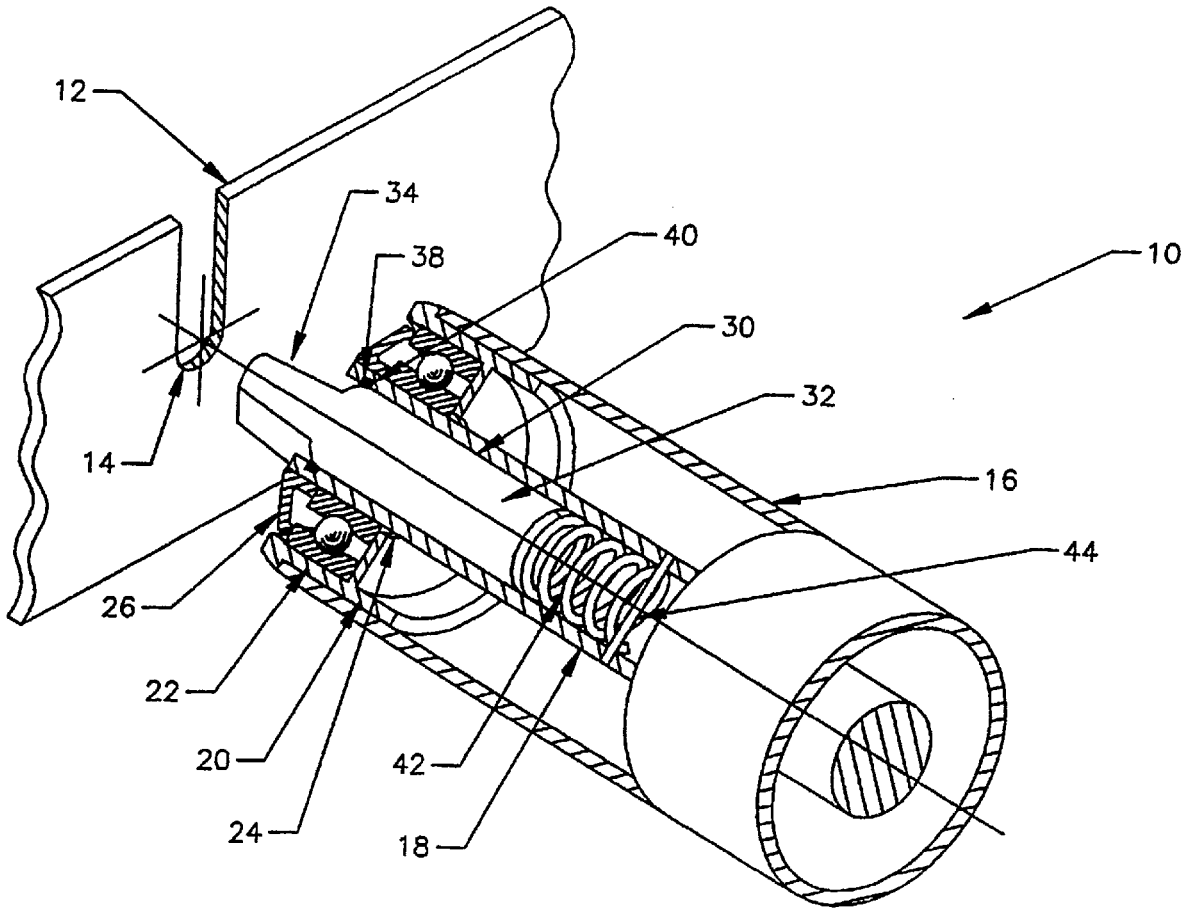

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 2, 6 and 11-13 are determined to be patentable as amended.

Claims 3-5, 7-10 and 14-22, dependent on an amended claim, are determined to be patentable.

New claims 23-31 are added and determined to be patentable.

1. A roller for a conveyor comprising:
  (a) a roller shaft;
  (b) a generally cylindrical roller tube rotatably mounted to said roller shaft;
  (c) a shuttle mounted at one end of said roller shaft, said shuttle being movable along the axis of the roller shaft between an extended position and a retracted position, wherein the shuttle includes a tapered end portion adapted to be inserted into a similarly shaped mounting hole in a frame member[and], *the tapered end portion being wider at one section than the mounting hole and tapering to an outer end that is narrower than the mounting hole*;
  *(d) an end cap that houses a bearing at the end of the roller tube; and*
  *(e) a bearing shield having an outer surface through which the tapered end portion of the shuttle extends when the shuttle is moved to the extended position;*
  *(f) wherein when the shuttle is moved to the retracted position, at least a portion of the tapered end portion moves inwardly past the bearing shield outer surface; and*
  [(d)] *(g)* wherein when the shuttle is moved to the extended position, the tapered end portion seats within the mounting hole in said frame member.

2. The roller according to claim 1 wherein the tapered end portion of said shuttle is *hexagonally* shaped to prevent rotation of the shuttle relative to the mounting hole.

6. The roller according to claims 4 [Wherein] *wherein* the biasing member is disposed within the axial opening in said roller shaft.

11. A conveyor assembly including:
  (a) a pair of generally parallel frame members having a series of longitudinally spaced openings formed therein;
  (b) one or more rollers disposed between said parallel frame members, said rollers including a stationary roller shaft and a roller tube rotatably mounted on said roller shaft, *said rollers including an end cap that houses a bearing at an end of said roller tube and a bearing shield having an outer surface*; and
  (c) mounting means for mounting said roller between said parallel frame members, said mounting means including a shuttle mounted for axial movement along said roller shaft between an extended position and a retracted position, said shuttle including a tapered end portion for engaging a corresponding opening in one of said frame members, *the tapered end portion having one section that is wider than the opening and gradually tapering to an outer end that is narrower than the opening;*
  *(d) wherein when the shuttle is moved to the extended position, the tapered end portion of the shuttle extends through the bearing shield outer surface; and*
  *(e) wherein when the shuttle is moved to the retracted position, at least a portion of the tapered end portion moves inwardly past the bearing shield outer surface.*

12. The conveyor assembly of claim [13] *11* wherein said mounting means further includes a biasing member disposed to urge the shuttle to an extended position.

13. The conveyor assembly according to claim [12] *11* wherein the tapered end position of said shuttle is *hexagonally* shaped to prevent rotation of the shuttle relative to the corresponding opening in said frame member.

*23. The roller according to claim 1 wherein the shuttle includes an axial opening that receives the end of the shaft.*

*24. The roller according to claim 23 wherein the shaft is solid.*

*25. The roller according to claim 23 further comprising a biasing member disposed to urge the shuttle to an extended position, wherein the axial opening of the shuttle is configured to receive the biasing member.*

*26. The roller according to claim 23 wherein the shuttle slides over the shaft between the extended and retracted positions.*

*27. A roller for a conveyor comprising:*
  *(a) a roller shaft;*
  *(b) a generally cylindrical roller tube rotatably mounted to said roller shaft; and*
  *(c) a shuttle mounted at one end of said roller shaft, said shuttle having an axial opening that receives the end of the roller shaft, said shuttle being movable along the axis of the roller shaft between an extended position and a retracted position, wherein the shuttle includes a tapered end portion adapted to be inserted into a similarly shaped mounting hole in a frame member, the tapered end portion being wider at one section than the mounting hole and tapering to an outer end that is narrower than the mounting hole;*
  *wherein when the shuttle is moved to the extended position, the tapered end portion seats within the mounting hole in said frame member.*

*28. The roller according to claim 27 further comprising a biasing member disposed to urge the shuttle to an extended position, wherein the axial opening of the shuttle is configured to receive the biasing member.*

*29. The roller according to claim 27 wherein the shuttle slides over the shaft between the extended and retracted positions.*

*30. The roller according to claim 27 wherein the shaft is solid.*

*31. The roller according to claim 27 further comprising:*
  *an end cap that houses a bearing at the end of the roller tube; and*
  *a bearing shield having an outer surface through which the tapered end portion of the shuttle extends when the shuttle is moved to the extended position;*
  *wherein when the shuttle is moved to the retracted position, at least a portion of the tapered end portion moves inwardly past the bearing shield outer surface.*

\* \* \* \* \*